United States Patent
Mundheim

(10) Patent No.: US 10,773,187 B2
(45) Date of Patent: Sep. 15, 2020

(54) COALESCING MEDIA PRODUCT AND METHOD

(71) Applicant: M Vest Water AS, Bergen (NO)

(72) Inventor: Atle Mundheim, Omastrand (NO)

(73) Assignee: M Vest Water AS, Bergen (NO)

( * ) Notice: Subject to any disclaimer, the term of this patent is extended or adjusted under 35 U.S.C. 154(b) by 0 days.

(21) Appl. No.: 16/494,779

(22) Filed: Sep. 17, 2019

(65) Prior Publication Data
US 2020/0094166 A1 Mar. 26, 2020

(30) Foreign Application Priority Data
Mar. 17, 2017 (NO) .................................. 20170400

(51) Int. Cl.
| B01D 17/04 | (2006.01) |
| C02F 1/40 | (2006.01) |
| B01D 17/02 | (2006.01) |
| B01J 20/02 | (2006.01) |
| B01J 20/32 | (2006.01) |
| C01B 33/10 | (2006.01) |
| C02F 101/32 | (2006.01) |

(52) U.S. Cl.
CPC ....... B01D 17/045 (2013.01); B01D 17/0205 (2013.01); B01J 20/027 (2013.01); B01J 20/3204 (2013.01); B01J 20/3236 (2013.01); C01B 33/10 (2013.01); C02F 1/40 (2013.01); C02F 2101/32 (2013.01)

(58) Field of Classification Search
CPC .. B01D 17/045; B01D 17/0205; B01J 20/027; B01J 20/3204; B01J 20/3236; C02F 1/40; C02F 2101/32; C01B 33/10
USPC .................................... 210/504, 799, DIG. 5
See application file for complete search history.

(56) References Cited

U.S. PATENT DOCUMENTS

| 8,673,393 B2 * | 3/2014 | Yuan .................... B01D 17/045 427/212 |
| 2010/0200512 A1 | 8/2010 | Chase et al. |
| 2015/0118414 A1 | 4/2015 | Morley et al. |

FOREIGN PATENT DOCUMENTS

| DE | 3516357 A | 11/1986 |
| WO | WO 2015143262 | 9/2015 |
| WO | WO 2015184436 | 12/2015 |

* cited by examiner

Primary Examiner — Thomas M Lithgow
(74) Attorney, Agent, or Firm — Christian D. Abei

(57) ABSTRACT

A coalizing product and a method for the coalescing of oil contaminants from a water flow is described, in which the product according to the invention is arranged in an apparatus for in depth coalescing of oil contaminated water. There are also disclosed uses of the method and the product for coalescing of oil contamination in water.

12 Claims, No Drawings

COALESCING MEDIA PRODUCT AND METHOD

The present invention relates to a product and a method for making the product and a use of the product and a method for coalescing oil in water by the use of the product as a coalescing medium as set forth in the following claim 1 and further independent claims.

More specifically, the invention relates to a product and preparation of a product for the coalescing of undesirable oil contaminants in process water so that the oil is more easily separated whereas the product comprises a granulated slick inorganic material where preferred material is crushed recycled glass where the typical chemical composition +/−up to 10% is as oxide; Silica 72%, Calcium 11%, Magnesium 2%, Lanthanum 1%, Sodium 13%, Cobalt 0.016%, Aluminum 1.5%, Lead<0, but similar granules with similar composition, such as quartz sand, can also be used. The raw material, according to the invention, is rendered superhydrophobic and super-oleophobic, that is, the contact angle of the liquids on the surface of the product is greater than or equal to 150-170 degrees. Hydrophobia and oleophobia are achieved by introducing a permanent bonding of a fluor-siloxane to the metal oxides in the raw material, whereby a permanent chemical bond forms between the fluor-siloxane and the metal oxides in the product by means of temperature.

Further, the invention relates to a method of using the product arranged as a media in which an oil contaminated water flow is processed through in order to coalesce oil droplets to large droplets which can easily be separated.

Further, the invention relates to a method of cleaning the filter media when it is saturated of present particles in the water flow.

Further, the invention relates to use of the filter media for coalescing oil in water.

The invention is related to the technology that aims at coalescing oil contaminants in a process water flow, by processing the water through a coalescing filter media that coalesces oil contamination in existing narrow passages in the media where the oil droplets collides.

The invention also relates to be able to use a superhydrophobic and super oleophobic granular coalescing media for oil-water coalescing excluding that hydrophobic properties is limiting hydraulic capacity of water throughflow in the filter media.

The invention also relates to being able to activate the media with a surfactant at first time use so that the hydrophobic surface is wetted by water due to priming with surfactant, such as isopropanol.

Further, the invention has the provision of introducing microbubbles of gas into the water flow prior to coalescence to promote the effect of coalescence through the product medium.

The invention also relates to a use of the product for the coalescence of oil from water in a process water flow and also to particle filtration with minimum biological growth on granules.

Known Product and Methods in Use Today

It is known that there are a vast variety of media for coalescing oil drops. In principle, coalescing is done by that the oily water flow is processed through a medium with large surface area, such as a plate package, granulated media or through a fibrous filter cartridge. All the methods are characterized by that the component of which the water flow is brought into contact with for coalescing should be oleophilic. This so that oil droplets attach to the surface and oil attached droplets attaches to other droplets until they grow so large that they detaches and follow the water flow as coalesced large easily separable droplets.

There are many known solutions where a coalescing granulate or other constructions such as mesh or fibres in a filter cartridge is modified to be highly oleophilic to collect droplets for coalescence.

It is known, but little used, that coalescence should occur by means of collisions of oil droplets by passing water flow through many narrow channels in a media filter in order for the droplets to collide. In the oil industry it is known that such a method easily leads to plugging of media, and in produced water context such filter media is contaminated by sulphate and carbonate deposits as well as particles and waxes.

It is also well known that fluorsiloxan can be used as hydrophobic and oleophobic coating on a surface.

It is also well known that siloxane products can be brought to bonding with metal oxides by adequate heat treatment.

DETAILED DESCRIPTION OF INVENTION

It is an objective of the invention to provide a oil coalescing granulated media by that it on the surface of the media is brought superhydrophobic and superoleophobic permanent chemical crosslinked bonds of a fluorsiloxan to metallic oxides present in granulated media, after which the medium after being placed in a filter composition is wetted with a surface active liquid and made hydrophilic, where most preferred wetting agent is an alcohol, after which the medium is washed with water, after which the media is introduced as a coalescing media in a process water flow containing oil, having modified hydrophilic and oleophobic properties but whereby affinity for gas bubbles is maintained as if the product was hydrophobic.

It is an objective of the invention to provide a product comprising a granulated substrate of crushed recycled glass or quartz sand or other slick material with metal oxide surfaces.

It is an objective of the invention to provide a method for the preparation of a product wherein 1-10% of fluorsiloxan, or preferably 3-5%, is solved in an nonpolar de-aromatized volatile hydrocarbon solvent, preferably iso-alkanic, and preferably with hydrocarbon chain lengths between C10 and C18 in which substrate is placed and wetted completely, whereupon solvent is evaporated off at temperature above evaporation temperature of solvent, typically between 170 and 220 degrees Celsius, after which the dry substrate with attached fluorsiloxan is heated to between 170 and 700 degrees Celsius for 15 minutes to 45 minutes, where the preferred temperature is 350-400 degrees Celsius for 30 minutes, whereby permanent crosslinking will take place between the metal oxide of the substrate and siloxane to form a permanent chemical bond.

It is an objective of the invention to provide a method for the manufacturing of a product wherein evaporated solvent is cooled to liquid state and reused for repeated mixing and dissolving of a fluorsiloxan for new coating of untreated substrate according to the invention.

It is an objective of the invention to provide a method of using the product by that the superhydrophobic oleophobic product is arranged in a filter bed, or in a filter housing, or in a filter cartridge through which a surface active liquid, preferably an alcohol, is processed, after which the product is rinsed by flushing with clean water, whereby the product now has a modified hydrophilic surface through which oil-contaminated process water is processed, and, in spite of the wetting, the product maintain its original oleophobic properties and suppresses the oil from settling on the surface.

It is an objective of the invention to provide a method for coalescing of oil droplets by processing oil-containing water through the product when it is arranged as a depth filter, characterized in that in front of the coalizing filter medium submicron gas bubbles are injected/created, which homogeneously are mixed in the water phase for bonding at or in the oil droplet, after which gas is heavily coalesced by processing through the product by the presence of gas affinity in the medium, whereby the gas bubble coalescence catalyses and formidably promotes a large coalescence of oil droplets.

It is an objective of the invention to provide a use of the product by arranging the product as a media filter in an open filter bed, or in a filter housing, or in a filter cartridge in order to coalesce oil in an oil-containing process water flow.

It is an objective of the invention to provide a use of the product and method of use for the purification of oil contamination from a process water flow.

The product, methods and uses of the invention are characterized by the features which are apparent from the characterization of the following dependent claims.

Further features of the invention are set forth in the independent claims.

According to the present invention, it is disclosed a new and improved oil-coalescing granulated medium by that it on the products surface is permanently chemically crosslinked a super-hydrophobic and super-oleophobic bonding of a fluorsiloxan to the metallic oxides present in the granulated media, whereby the media after being arranged as a filter composition is wetted with a surface active liquid and made hydrophilic, wetting agent is preferably an alcohol, after which the media is rinsed with water, after which the media is introduced as a coalescing media in a process water flow with oil, having modified hydrophilic and oleophobic properties but whereby affinity for gas bubbles is maintained as if the product was hydrophobic.

According to the present invention, there is thus obtained a new and improved product in which a granulated substrate comprises of crushed recycled glass or quartz sand or other slick surface material with metal oxide.

According to the present invention there is thus provided a new and improved method for the preparation of a product wherein 1-10% of fluorsiloxan, or preferably 3-5%, is solved in an nonpolar de-aromatized volatile hydrocarbon solvent, preferably iso-alkanic, and preferably with hydrocarbon chain lengths between C10 and C18 in which substrate is placed and wetted completely, whereupon solvent is evaporated off at temperature above evaporation temperature of solvent, typically between 170 and 220 degrees Celsius, after which the dry substrate with attached fluorsiloxan is heated to between 170 and 700 degrees Celsius for 15 minutes to 45 minutes ,where the preferred temperature is 350-400 degrees Celsius for 30 minutes, whereby permanent crosslinking will take place between the metal oxide of the substrate and siloxane to form a permanent chemical bond.

According to the present invention, there is disclosed a new and improved method of manufacturing a product in which evaporated solvent is cooled to liquid state and reused for repeated mixing and dissolution of a fluorsiloxan for new coating of untreated substrate according to the invention.

According to the present invention there is thus provided a new and improved method for use of the product in that the superhydrophobic oleophobic product is arranged in a filter bed, or in a filter housing, or in a filter cartridge through which a surface active liquid, preferably an alcohol, is processed, after which the product is rinsed by flushing with clean water, whereby the product now has a modified hydrophilic surface through which oil-contaminated process water is processed ,and, in spite of the wetting, the product maintain its original oleophobic properties and suppresses the oil from settling on the surface.

According to the present invention, there it is disclosed a method for coalescing of oil droplets by processing oil-containing water through the product when it is arranged as a depth filter, characterized in that in front of the coalizing filter medium submicron gas bubbles are injected/created, which homogeneously are mixed in the water phase for bonding at or in the oil droplet, after which gas is heavily coalesced by processing through the product by the presence of gas affinity in the medium, whereby the gas bubble coalescence catalyses and formidably promotes a large coalescence of oil droplets.

According to the present invention, there it is disclosed a new and improved use of the product by arranging the product as a media filter in an open filter bed, or in a filter housing, or in a filter cartridge in order to coalesce oil in an oil-containing process water flow.

According to the present invention, it is disclosed a new and improved use of the product and method of use for purifying oil contamination from a process water flow.

The invention is characterized by that it on the products surface is permanently chemically crosslinked a superhydrophobic and super-oleophobic bonding of a fluorsiloxan to the metallic oxides present in the granulated media, whereby the media after being arranged as a filter composition is wetted with a surface active liquid and made hydrophilic, wetting agent is preferably an alcohol, after which the media is rinsed with water, after which the media is introduced as a coalescing media in a process water flow with oil, having modified hydrophilic and oleophobic properties but whereby affinity for gas bubbles is maintained as if the product was hydrophobic. Oppfinnelsen karakteriseres ved at granulert substrat består av knust resirkulert glass eller kvartssand eller annet glatt materiale med metalloksid overflater.

The invention is characterized by granulated substrate comprises of crushed recycled glass or quartz sand or other slick surfaced material with metal oxide.

The invention is characterized by that 1-10% of fluorsiloxan, or preferably 3-5%, is solved in an nonpolar de-aromatized volatile hydrocarbon solvent, preferably iso-alkanic, and preferably with hydrocarbon chain lengths between C10 and C18 in which substrate is placed and wetted completely, whereupon solvent is evaporated off at temperature above evaporation temperature of solvent, typically between 170 and 220 degrees Celsius, after which the dry substrate with attached fluorsiloxan is heated to between 170 and 700 degrees Celsius for 15 minutes to 45 minutes ,where the preferred temperature is 350-400 degrees Celsius for 30 minutes, whereby permanent crosslinking will take place between the metal oxide of the substrate and siloxane to form a permanent chemical bond.

The invention is characterized by evaporated solvent is cooled to liquid state and reused for repeated mixing and dissolving of a fluorsiloxan for new coating of untreated substrate according to the invention.

The invention is characterized by the superhydrophobic oleophobic product is arranged in a filter bed, or in a filter housing, or in a filter cartridge through which a surface active liquid, preferably an alcohol, is processed, after which the product is rinsed by flushing with clean water, whereby the product now has a modified hydrophilic surface through which oil-contaminated process water is processed, and, in spite of the wetting, the product maintain its original oleophobic properties and suppresses the oil from settling on the surface.

The invention is characterized by coalescing of oil droplets by processing oil-containing water through the product when it is arranged as a depth filter, characterized in that in front of the coalizing filter medium submicron gas bubbles are injected/created, which homogeneously are mixed in the water phase for bonding at or in the oil droplet, after which gas is heavily coalesced by processing through the product by the presence of gas affinity in the medium, whereby the gas bubble coalescence catalyses and formidably promotes a large coalescence of oil droplets.

The invention is characterized by a product that is arranged as a media filter, in an open filter bed, or in a filter housing, or in a filter cartridge to coalesce oil in an oil-containing process water flow.

The invention is characterized by use for treatment oil pollution from a process water flow.

Advantages with the New Invention

The present product is based on a new way of coalescing because the coating material is completely hydrophobic and simultaneously oleophobic, after which the hydrophobic property is converted with surface active substance to obtain hydraulic capacity in the coalescing unit. Surprisingly, it was discovered that despite modified to hydrophilic, the media held very high affinity for gas in the water as if it were still hydrophobic. At the same time, no oil attached to the media surface, and it is coalesced without gas, mainly due to collisions between oil droplets in narrow passages in the media. However, it was surprisingly discovered that with the release of microbubbles of gas upstream the coalescing media, the gas attached to the product particles and coalesced in large bubbles. In this process, gas was attached to oil, and with gas as a catalyst, formidable coalescence of oil appeared in combination with gas.

In addition to this, the new invention has the advantage that no wax, or sticky oil, carbonate or sulphate scale deposits on the media hence it is discarding all organic and inorganic components.

By plugging caused particles in the water, the media can easily be back flushed.

Production of Product for Tests 50 liters of poly siloxan were dissolved in a vessel in 950 liters of aliphatic de-aromatized hydrocarbon solvent with hydrocarbon chains C11-c15. Then 1 m3 crushed recycled glass sand with grain size 1.0-2.0 mm was added to the vessel. The mixture was left for 5 minutes to ensure complete liquid intrusion into glacial sand. Then, excess fluid was drained off. Then, solvent was evaporated at 200 degrees Celsius, cooled and recycled for reuse. The dry mass was then exposed to 400 degrees Celius temperature for 25 minutes. The finished product was then cooled.

Test 1

Two identical bottles with fine mesh bottom were filled with 5 l of product to a 40 cm filter depth. Mesh was also applied on the top to keep the medium in place hence processing of oil-containing water from below and upward with addition of mixed in gas in glass A and without gas in glass B as the only difference in operational conditions.

Production of stock solution of synthetic water with oil emulsion;

1 m3 synthetic 60 degrees Celsius hot produced water was made with salinity 12% where additional to NaCl2, 4000 ppm NaSO4 and 4000 ppm CaCl2, 500 ppm NaCO3 and 1000 ppm BaCl2 and 10 ppm MgCl2 were added. 8000 ppm crude oil was sheared into microemulsion with a high-speed multi-stage centrifugal pump.

Identical amounts of produced water was supplied and water was physically pumped in from below after gas was mixed into it, at a rate of 30 m3/h.

In sample A containing gas, one noted that gas coalesced significantly in the medium, and that after the coalescence, the water became very transparent. Sample B contained clearly more turbid water and much of the emulsified oil was not coalesced. Samples were analyzed from the two test tubes, and the results showed that the including gas achieved to clean it to 43 ppm and without gas it was cleaned to 1200 ppm.

The invention claimed is:

1. An oil coalescing granulated media product, comprising a granulated substrate having a metal oxide-containing surface, fluorosiloxane permanently cross-linked to the metal oxide-containing surface, and wherein the product is wetted by a surfactant liquid, preferably an alcohol.

2. Product according to claim 1, wherein the granulated substrate comprises crushed recycled glass or quartz sand.

3. A method for producing an oil-coalescing granulated media product, comprising dissolving 1-10% of fluorosiloxane in an nonpolar, de-aromatized volatile hydrocarbon solvent to a solution in which a granular substrate having a metal oxide surface is placed and completely wetted by solution, after which solvent is evaporated at temperature above the evaporation temperature of solvent so that the substrate is dried and that the fluorosiloxane is adhered to the substrate, after which the dry substrate with attached fluorosiloxane is heated to between 170 and 700 degrees Celsius for 15 minutes to 45 minutes, whereby permanent cross-linking will occur place between the substrate metal oxides and siloxane and form a permanent chemical bond.

4. A method according to claim 3, wherein the substrate is crushed recycled glass or quartz sand.

5. A method according to claim 3, wherein the amount of the fluosiloxane is 3-5%.

6. The method of claim 3, wherein the hydrocarbon solvent is iso-alkanic, with hydrocarbon chain lengths from C10 to C18.

7. A method according to claim 3, wherein evaporation temperature is between 170-220 degrees Celsius.

8. A method according to claim 3, wherein the substrate is heated to between 350-400 degrees Celsius.

9. A method according to claim 3, wherein the dried substrate is wetted by a surfactant liquid, preferably an alcohol.

10. A method according to claim 3, wherein the evaporated solvent is cooled to liquid form and reused for repeated incorporation and dissolution of a fluorosiloxane for re-coating untreated substrate according to the invention.

11. A method of coalescing oil droplets by processing and purifying a stream of oily water, comprising the steps of
   a. arranging a product made according to any one of claims 3-10 as a filter for the stream, b. homogeneously mixing submicron gas bubbles in the water stream for bonding on or in the oil droplets in front of the filter;

c. whereby a gas flow of the gas bubbles and associated oil droplets is processed through the product, which, through the product's gas affinity and oil phobia, causes gas bubble coalescence to catalyze and promote coalescence of the oil droplets.

12. A method according to claim 11, wherein the product is placed as a media filter in an open filter bed or in a filter housing or in a filter cartridge.

* * * * *